May 31, 1938.     H. RIEPERT     2,119,354
OBJECT CARRIER FOR MICROSCOPES
Filed April 2, 1936
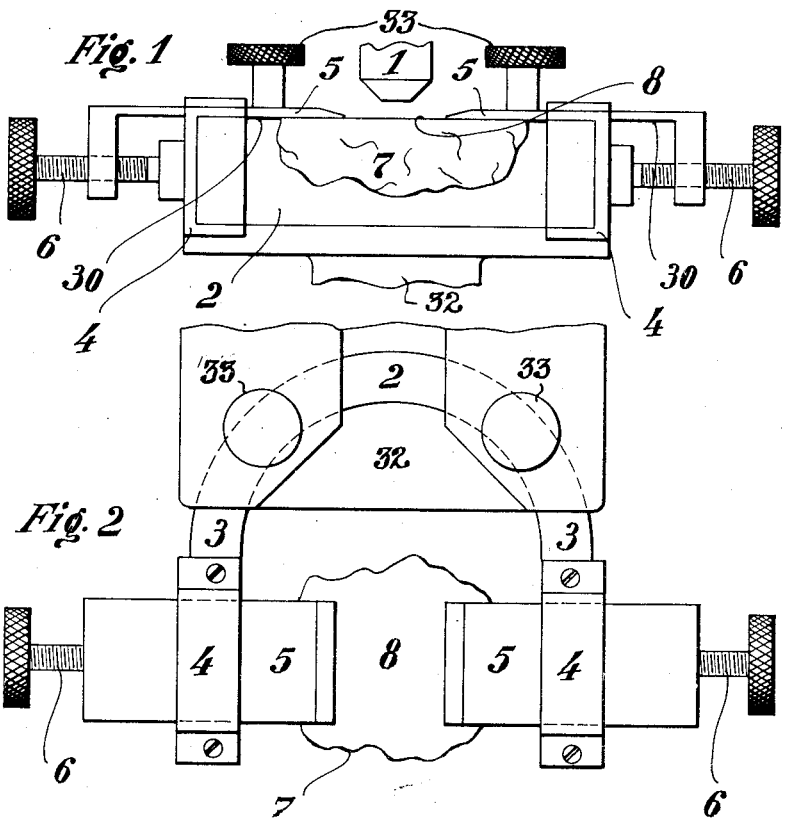
INVENTOR
Hermann Riepert
BY
Ivan E. A. Königsberg
ATTORNEY Patented May 31, 1938

2,119,354

UNITED STATES PATENT OFFICE 2,119,354

OBJECT CARRIER FOR MICROSCOPES

Hermann Riepert, Wetzlar, Germany, assignor to Ernst Leitz, G. m. b. H., Wetzlar, Germany Application April 2, 1936, Serial No. 72,226
In Germany April 4, 1935

1 Claim. (Cl. 88—40)

This invention relates to improvements in object carriers for microscopes. The object of the invention is to provide improved means for supporting irregularly shaped objects in position to be examined under a microscope. The advantages of the invention are that objects may be prepared for examination by providing the object with only one polished examination surface and that the object is quickly and accurately placed in proper position. Other objects will appear as this specification proceeds while reference is had to the accompanying drawing in which Fig. 1 is a front elevation of a magnetic object carrier.

Fig. 2 is a plan view thereof.

In the drawing the microscope is identified by the microscope objective 1. Underneath the latter, in Figures 1 and 2, there is suitably supported upon a part 32 of the microscope a horseshoe magnet 2 having the two arms 3, 3. The magnet 2 may be secured to the microscope by screw members 33. The magnet may be permanent or electric. The ends of the magnet arms carry guides 4, 4. Each guide supports a hanger 5 which is movable in the guide by means of a screw 6. The hangers have lower horizontal attaching surfaces 30. The object 7, which is metallic, is provided with a polished examination surface 8 as is usual. In use the hangers are adjusted by turning the screws 6 so as to center the object under the objective 1 and then the object is simply brought into contact with the hangers to which the object is attracted and held by the magnetic force in an obvious manner.

I claim:—

An object carrier for microscopes comprising a horseshoe magnet, means for securing the same to the microscope below the objective tube thereof, object supporting members, guides in the ends of the horseshoe magnet for supporting the said members in movable relation to the horseshoe magnet and the microscope tube, said supporting members having object attracting surfaces for magnetically contacting and holding the object and screws in said guides for adjusting the said supporting members to position the object for examination by the microscope.

HERMANN RIEPERT.